United States Patent
Xie et al.

(10) Patent No.: US 12,545,008 B2
(45) Date of Patent: Feb. 10, 2026

(54) FINE-DENIER COMPOSITE NON-WOVEN FABRIC AND FABRICATION METHOD THEREFOR

(71) Applicant: XIAMEN YANJAN NEW MATERIAL CO., LTD., Fujian (CN)

(72) Inventors: Jihua Xie, Fujian (CN); Jixiang Cai, Fujian (CN); Qingzhong Zheng, Fujian (CN)

(73) Assignee: XIAMEN YANJAN NEW MATERIAL CO., LTD., Fujian (CN)

( * ) Notice: Subject to any disclaimer, the term of this patent is extended or adjusted under 35 U.S.C. 154(b) by 185 days.

(21) Appl. No.: 18/288,583

(22) PCT Filed: Jan. 27, 2022

(86) PCT No.: PCT/CN2022/074233
§ 371 (c)(1),
(2) Date: Oct. 27, 2023

(87) PCT Pub. No.: WO2022/227749
PCT Pub. Date: Nov. 3, 2022

(65) Prior Publication Data
US 2024/0208177 A1    Jun. 27, 2024

(30) Foreign Application Priority Data
Apr. 30, 2021 (CN) .......................... 202110483498.1

(51) Int. Cl.
*B32B 5/26* (2006.01)

(52) U.S. Cl.
CPC ........ *B32B 5/267* (2021.05); *B32B 2262/144* (2021.05); *B32B 2262/16* (2021.05); *B32B 2307/718* (2013.01)

(58) Field of Classification Search
CPC ............... B32B 5/267; B32B 2262/16; B32B 2262/144; B32B 2307/718
See application file for complete search history.

(56) References Cited

U.S. PATENT DOCUMENTS

| 2004/0077247 | A1* | 4/2004 | Schmidt | .................... E04B 1/88 442/361 |
| 2014/0272261 | A1* | 9/2014 | Udengaard | ........ D04H 1/43912 428/92 |

* cited by examiner

*Primary Examiner* — Alicia J Weydemeyer
*Assistant Examiner* — Laura B Figg
(74) *Attorney, Agent, or Firm* — Birchwood IP

(57) ABSTRACT

A fine denier composite non-woven fabric comprising an upper layer fine denier fiber web composed of fibers with a fiber denier less than or equal to 1.0 denier and a lower layer coarse denier fiber web composed of fibers with a fiber denier of 2.0 deniers to 12.0 deniers; the upper layer fine denier fiber web being composed of side-by-side bi-component crimped spunbond long fibers, and adjacent fibers being bonded to each other through surface melting to form a fiber web.

3 Claims, 3 Drawing Sheets

FINE-DENIER COMPOSITE NON-WOVEN FABRIC AND FABRICATION METHOD THEREFOR

TECHNICAL FIELD

The present invention relates to the technical field of non-woven fabrics, and in particular to a fine denier composite non-woven fabric that is applied in personal care and infant care, and a manufacturing method therefor.

BACKGROUND OF THE INVENTION

Non-woven fabrics are favored by consumers due to their simple production process, high output, low cost, softness, skin-friendliness, and other features, making them suitable for disposable hygiene products. The fiber denier in the formation of non-woven fabrics significantly affects their performance. Smaller fiber denier results in smaller fiber diameters, yielding non-woven fabrics with a finer, smoother texture. Conversely, larger fiber denier results in larger fiber diameters, yielding non-woven fabrics with increased porosity, which is advantageous for breathability and liquid absorption, making the non-woven fabric more fluffy. For use in disposable hygiene products, non-woven fabrics come into direct contact with the user's skin, requiring higher standards of softness, smoothness, and skin-friendliness. Therefore, such non-woven fabrics typically use fibers with a fiber denier of 1.5 deniers to 3.0 deniers. Fibers with a fiber denier less than or equal to 1.0 denier, although yielding softer non-woven fabrics with a finer texture, present challenges in fiber carding during production, resulting in uneven non-woven fabric web surfaces and other issues.

BRIEF SUMMARY OF THE INVENTION

Technical Problems to be Solved

It is an object of the present invention to provide a fine denier composite non-woven fabric with a fine and soft texture and a manufacturing method therefor, thereby overcoming the defects of existing products and production methods.

TECHNICAL SOLUTIONS TO THE TECHNICAL PROBLEMS

Technical Solutions

To attain this, the technical solutions of the present invention are as follows: A fine denier composite non-woven fabric comprising an upper layer fine denier fiber web composed of fibers with a fiber denier less than or equal to 1.0 denier and a lower layer coarse denier fiber web composed of fibers with a fiber denier of 2.0 deniers to 12.0 deniers; the upper layer fine denier fiber web being composed of side-by-side bi-component crimped spunbond long fibers, and adjacent side-by-side bi-component crimped spunbond long fibers being bonded to each other through surface melting; the side-by-side bi-component crimped spunbond long fibers being composed of a high-melting-point resin and a low-melting-point resin with a difference in melting points of over 20° C.; the high-melting-point resin and the low-melting-point resin having different shrinkage stresses; the lower layer coarse denier fiber web having a gram weight of 5 g/m² to 10 g/m².

The upper layer fine denier fiber web has a fiber denier of 0.6 denier to 1.0 dernier.

The lower layer coarse denier fiber web is a fiber web with no bonding between fibers or a non-woven fabric with presence of bonding between fibers.

A fine denier composite non-woven fabric manufacturing method comprising the following processes: (1) Upper layer fine denier fibers supply process: employing a spunbonding process, wherein two thermoplastic resins with a melting point difference greater than or equal to 20° C. are separately heated through hot-melt extrusion devices; once melted, they enter a spinning device where the high-temperature melts are transformed into fine melt streams; subsequently, the fine melt streams are extruded through side-by-side bi-component spinneret holes on a spinneret plate, forming coarse side-by-side bi-component spunbond long fibers; the fibers are then cooled by side-blowing cold air and formed into side-by-side bi-component spunbond long fibers with a fiber denier of 1.0 or less denier through a stretching device;

(2) Upper layer fine denier fibers crimping process: the side-by-side bi-component spunbond long fibers are laid out to form a fiber web and then enter a hot air oven; under action of hot air at a temperature of 100° C. to 110° C., the side-by-side bi-component spunbond long fibers, due to differing shrinkage stresses of the high-melting-point resin and the low-melting-point resin, begin to crimp, forming an upper layer fine denier unbonded fiber web;

(3) Lower layer coarse denier fiber web supply process: the lower layer coarse denier fiber web is conveyed to an exit of the upper layer fine denier fibers crimping process;

(4) Layering process: the upper layer fine denier unbonded fiber web is overlaid with the lower layer coarse denier fiber web at the exit of the upper layer fine denier fibers crimping process to form an overlapping composite mesh with an upper layer being the fine denier unbonded fiber web and a lower layer being the coarse denier fiber web;

(5) Forming process: the overlapping composite mesh is passed through a heating device where the upper layer fine denier unbonded fiber web is bonded to form the upper layer fine denier fiber web; the upper layer fine denier fiber web and the lower layer coarse denier fiber web are then consolidated together and thereafter wound to form the fine denier composite non-woven fabric.

The lower layer coarse denier fiber web is a coarse denier non-woven fabric with presence of bonding between fibers; in the process (3), the coarse denier non-woven fabric is unwound by an unwinding device and thereafter conveyed to the exit of the upper layer fine denier fibers crimping process through a guide roller.

The lower layer coarse denier fiber web is a fiber web with no bonding between fibers; in the process (3), the fiber web with no bonding between fibers which is produced in-line is conveyed to the exit of the upper layer fine denier fibers crimping process through a carding machine.

The heating device is a hot air oven, heated compression rollers, or a combination thereof.

The heating device has a temperature of 130° C.-150° C.

BENEFICIAL EFFECTS OF THE PRESENT INVENTION

Beneficial Effects

By adopting the above-mentioned solutions, the upper layer fine denier fiber web of the fine denier composite non-woven fabric according to the present invention is composed of side-by-side bi-component crimped spunbond long fibers. Due to the differing shrinkage stresses of the two thermoplastic resins, the fibers first undergo free crimping in a stacked state with no bonding between adjacent fibers under the action of hot air at 100° C. to 110° C. Subsequently, in the heating device, the low-melting-point resin begins to melt and bond together with adjacent fibers, forming the upper layer fine denier fiber web. As a result, when the upper layer fine denier fiber web is overlaid and consolidated with the lower layer coarse denier fiber web to form a fine denier composite non-woven fabric, there are fewer bonding points between the upper layer fibers due to fiber crimping. This not only enhances the softness and fluffiness of the fine denier composite non-woven fabric but also effectively avoids issues associated with fine fibers, such as the difficulty in carding and processing. Additionally, as the side-by-side bi-component crimped spunbond long fibers are finer, the upper layer fine denier fiber web is formed with a fine and smooth texture, making it more skin-friendly. Simultaneously, the compounded lower layer coarse denier fiber web can enhance the mechanical properties of the fine denier composite non-woven fabric, enabling the fine denier composite non-woven fabric to possess better tensile strength even with a low gram weight. Additionally, the fiber denier of the lower layer fiber web is coarse, facilitating liquid flow and permeation. The coarse fibers can also contribute to improved fluffiness and thickness-direction resilience of the composite non-woven fabric, enhancing comfort during use.

Figure 1:
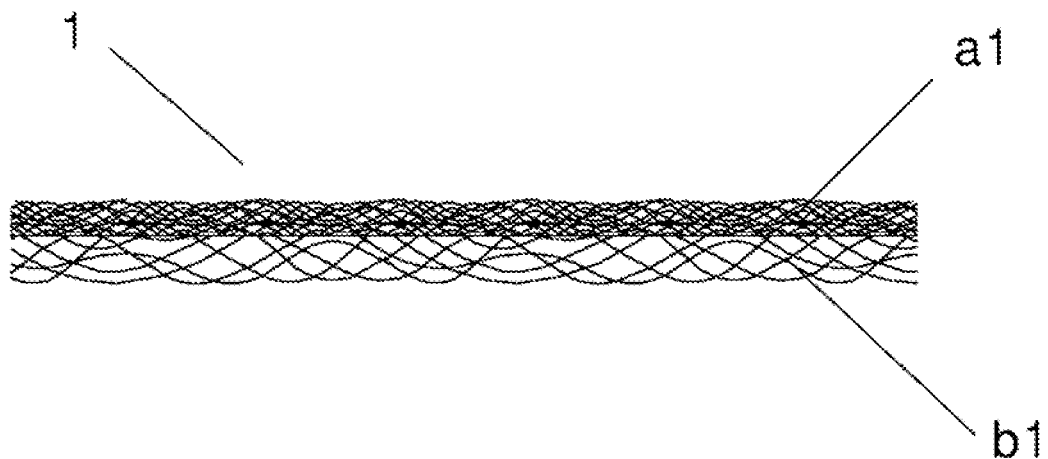
FIG. 1 is a cross-sectional view of the fine denier composite non-woven fabric according to Embodiment 1 of the present invention.

Description of reference numerals: 1 (2) fine denier composite non-woven fabric: 11 side-by-side bi-component crimped spunbond long fiber; 11a high-melting-point resin; 11b low-melting-point resin; a1 (a2) upper layer fine denier fiber web; b1 (b2) lower layer coarse denier fiber web.

Embodiment 1: A1, A1' hot-melt extrusion device; B1 spinning device; C1 spinneret plate; D1 side-blowing cold air; E1 stretching device; F1 hot air oven in the upper layer fine denier fibers crimping process; G1 guide roller; H1 hot air oven in the forming process; I1 pair of heated compression rollers; d1 coarse side-by-side bi-component spunbond long fibers; e1 side-by-side bi-component spunbond long fibers; f1 upper layer fine denier unbonded fiber web.

Embodiment 2: A2, A2' hot-melt extrusion device; B2 spinning device; C2 spinneret plate; D2 side-blowing cold air; E2 stretching device; F2 hot air oven in the upper layer fine denier fibers crimping process; H2 hot air oven in the forming process; I2 unwinding and loosening machine; G2 carding machine; d2 coarse side-by-side bi-component spunbond long fibers; e2 side-by-side bi-component spunbond long fibers; f2 upper layer fine denier unbonded fiber web.

DETAILED DESCRIPTION OF THE INVENTION

Embodiments of the Present Invention

In order to further explain the technical solutions of the present invention, the present invention will be described in detail with some specific embodiments.

Figure 2:
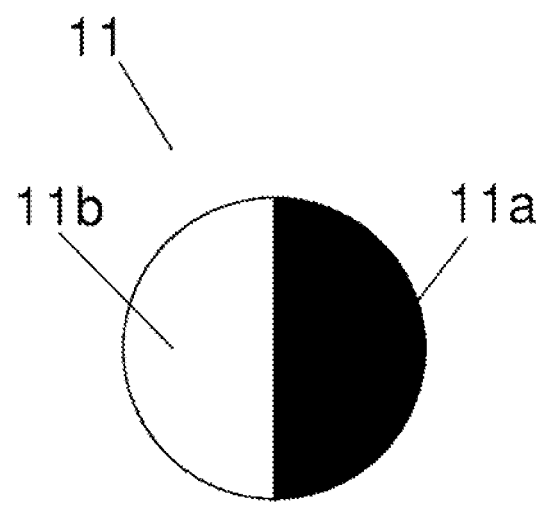
FIG. 2 is a cross-sectional view of the side-by-side bi-component crimped spunbond long fiber according to the present invention.
Figure 4:
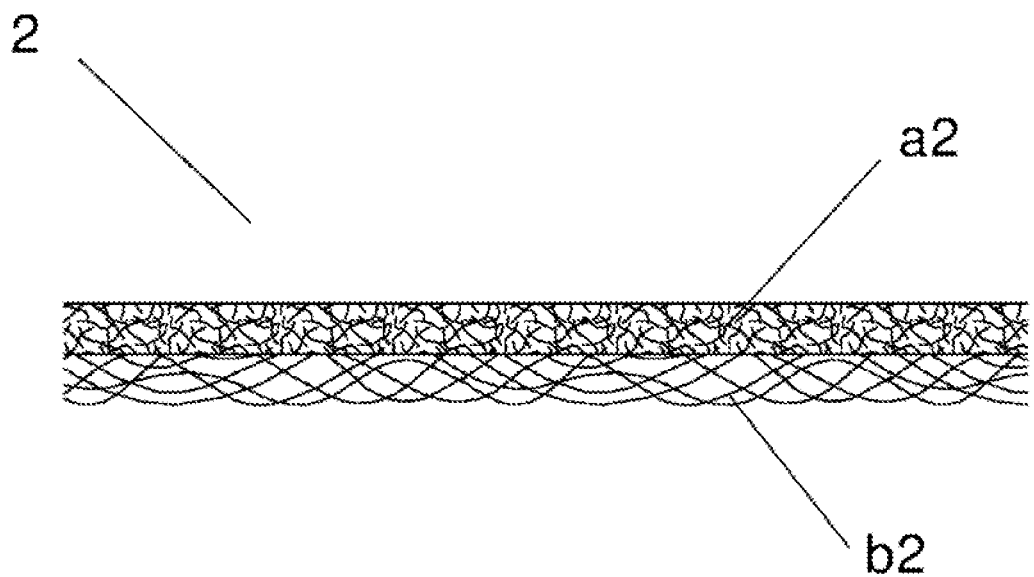
FIG. 4 is a cross-sectional view of the fine denier composite non-woven fabric according to Embodiment 2 of the present invention.

As shown in FIGS. 1, 2, and 4, the present invention discloses a fine denier composite non-woven fabric 1 (2), which comprises an upper layer fine denier fiber web a1 (a2) composed of fibers with a fiber denier less than or equal to 1.0 denier and a lower layer coarse denier fiber web b1 (b2) composed of fibers with a fiber denier of 2.0 deniers to 12.0 deniers. The upper layer fine denier fiber web a1 (a2) is composed of side-by-side bi-component crimped spunbond long fibers 11, and adjacent fibers are bonded to each other through surface melting. The side-by-side bi-component crimped spunbond long fibers 11 are composed of a high-melting-point resin 11a and a low-melting-point resin 11b with a difference in melting points of over 20° C. The high-melting-point resin 11a and the low-melting-point resin 11b have different shrinkage stresses. The gram weight of the lower layer coarse denier fiber web b1 (b2) is 5 g/m$^2$ to 10 g/m$^2$.

The fiber web of the lower layer coarse denier fiber web b1 (b2) is a fiber web with no bonding between fibers or a non-woven fabric with presence of bonding between fibers.

Embodiment 1

Figure 3:
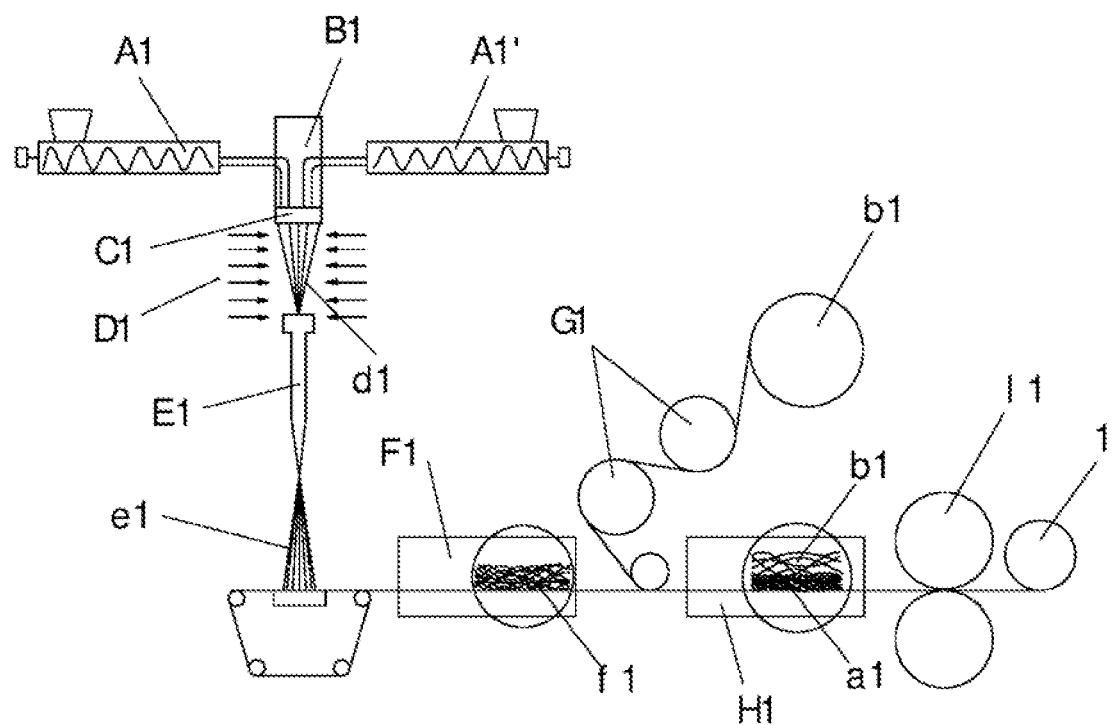
FIG. 3 is a schematic diagram of the manufacturing of the fine denier composite non-woven fabric according to Embodiment 1 of the present invention.

As shown in FIG. 3 and in conjunction with FIGS. 1 and 2, the fine denier composite non-woven fabric according to the present invention adopts the following manufacturing methods: (1) Upper layer fine denier fibers supply process: Employing a spunbonding process, two thermoplastic resins, namely high-density polyethylene (HDPE) and polypropylene (PP), with a melting point difference greater than or equal to 20° C., are separately heated through hot-melt extrusion devices A1 and A1'. Once melted, they enter a spinning device B1, where the high-temperature melts are transformed into fine melt streams. Subsequently, the fine melt streams are extruded through side-by-side bi-component spinneret holes on a spinneret plate C1, forming coarse side-by-side bi-component spunbond long fibers d1. These fibers are then cooled by side-blowing cold air D1 and formed into side-by-side bi-component spunbond long fibers e1 with a fiber denier of 1.0 denier through a stretching device E1.

(2) Upper layer fine denier fibers crimping process: The side-by-side bi-component spunbond long fibers e1 are laid out to form a fiber web and then enter a hot air oven F1. Under the action of hot air at a temperature of 100° C. to 110° C., the side-by-side bi-component spunbond long fibers e1, due to differing shrinkage stresses of the high-melting-point polypropylene (PP) and the low-melting-point high-density polyethylene (HDPE) resins, begin to crimp, forming side-by-side bi-component crimped spunbond long fibers 11, thus forming the upper layer fine denier unbonded fiber web f1.

(3) Lower layer coarse denier fiber web supply process: The lower layer coarse denier fiber web b1 is conveyed to the exit of the upper layer fine denier fibers crimping process through the guide roller G1, wherein the lower layer coarse denier fiber web b1 is a coarse non-woven fabric with presence of bonding between fibers, and with a fiber denier of 4 deniers.

(4) Layering process: The upper layer fine denier unbonded fiber web f1 is overlaid with the lower layer coarse denier fiber web b1 at the exit of the upper layer fine denier fibers crimping process to form an overlapping composite mesh with the upper layer being the fine denier unbonded fiber web f1 and the lower layer being the coarse denier fiber web b1.

(5) Forming process: The overlapping composite mesh is passed through a hot air oven H1, where the upper layer fine denier unbonded fiber web f1 is exposed to hot air, causing the low-melting-point resin on the surface layer to begin to melt, and adjacent fibers begin to bond together, forming the upper layer fine denier fiber web a1. The upper layer fine denier fiber web a1 and the lower layer coarse denier fiber web b1 are then consolidated together through a pair of heated compression rollers I1, wherein the temperature of the hot air oven H1 is set to 130° C. and the temperature of the heated compression rollers I1 is set to 125° C. The material is then wound to form the fine denier composite non-woven fabric 1.

By adopting the above-mentioned solutions, the upper layer fine denier fiber web a1 of the fine denier composite non-woven fabric 1 according to the embodiment is composed of side-by-side bi-component crimped spunbond long fibers 11. Due to the differing shrinkage stresses of high-density polyethylene (HDPE) and polypropylene (PP), the fibers first undergo free crimping in a stacked state with no bonding between adjacent fibers under the action of hot air at 100° C. to 110° C. Subsequently, under the action of hot air at 130° C., the low-melting-point resin begins to melt and bond together with adjacent fibers, forming the upper layer fine denier fiber web a1. The crimping of the fibers formed in this way will not be affected by the consolidating of adjacent fibers, resulting in a higher degree of crimping. As a result, when the upper layer fine denier fiber web is overlaid and consolidated with the lower layer coarse denier fiber web b1 to form the fine denier composite non-woven fabric, there are fewer bonding points between the upper layer fibers due to fiber crimping. This not only enhances the softness and fluffiness of the fine denier composite non-woven fabric but also effectively avoids issues associated with fine deniers, such as their small denier causing difficulty in carding and processing. Additionally, as the side-by-side bi-component crimped spunbond long fibers are finer, the upper layer fine denier fiber web is formed with a fine and smooth texture, making it more skin-friendly. Simultaneously, the compounded lower layer coarse denier fiber web can enhance the mechanical properties of the fine denier composite non-woven fabric, enabling the fine denier composite non-woven fabric to possess better tensile strength even with a low gram weight.

Embodiment 2

Figure 5:
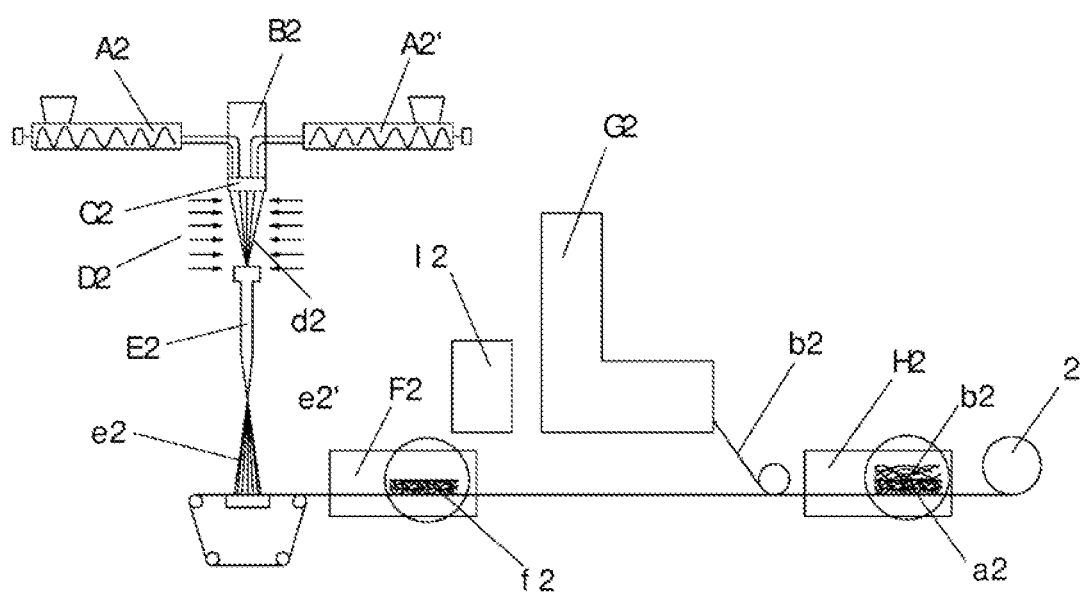
FIG. 5 is a schematic diagram of the manufacturing of the fine denier composite non-woven fabric according to Embodiment 2 of the present invention.

As shown in FIGS. 4 and 5, the fine denier composite non-woven fabric according to the present invention adopts the following manufacturing methods: (1) Upper layer fine denier fibers supply process: Employing a spunbonding process, two thermoplastic resins, namely polypropylene (PP) and low-melting-point polyethylene terephthalate (PET), with a melting point difference greater than or equal to 20° C., are separately heated through hot-melt extrusion devices A2 and A2'. Once melted, they enter a spinning device B2, where the high-temperature melts are transformed into fine melt streams. Subsequently, the fine melt streams are extruded through side-by-side bi-component spinneret holes on a spinneret plate C2, forming coarse side-by-side bi-component spunbond long fibers d2. These fibers are then cooled by side-blowing cold air D2 and formed into side-by-side bi-component spunbond long fibers e2 with a fiber denier of 0.8 deniers through a stretching device E2.

(2) Upper layer fine denier fibers crimping process: The side-by-side bi-component spunbond long fibers e2 are laid out to form a fiber web and then enter a hot air oven F2. Under the action of hot air at a temperature of 100° C. to 110° C., the side-by-side bi-component spunbond long fibers e2, due to the differing shrinkage stresses of the high-melting-point polypropylene (PP) and the low-melting-point polyethylene terephthalate (PET) resins, begin to crimp, forming side-by-side bi-component crimped spunbond long fibers 11, thus constituting the upper layer fine denier unbonded fiber web f2.

(3) Lower layer coarse denier fiber web supply process: The lower layer coarse denier fiber web b2 is passed through an unwinding and loosening machine I2 to loosen the 6-denier PE/PET fibers. The fibers are carded into a fiber web b2 through a carding machine G2 and then conveyed to the exit of the upper layer fine denier fibers crimping process, wherein the lower layer coarse denier fiber web b2 is a coarse denier fiber web with no bonding between fibers, and with a fiber denier of 6 deniers.

(4) Layering process: The upper layer fine denier unbonded fiber web f2 is overlaid with the lower layer coarse denier fiber web b2 at the exit of the upper layer fine denier fibers crimping process to form an overlapping composite mesh with the upper layer being the fine denier unbonded fiber web f2 and the lower layer being the coarse denier fiber web b2.

(5) Forming process: The overlapping composite mesh is passed through a hot air oven H2, where the upper layer fine denier unbonded fiber web f2 is exposed to hot air, causing the low-melting-point resin on the surface layer to begin to melt, and adjacent fibers begin to bond together, forming the upper layer fine denier fiber web a2. The low-melting-point PE resin on the surface layer of the lower layer coarse denier fiber web b2 also begins to melt and bond with adjacent fibers, which simultaneously consolidates the upper layer fine denier fiber web a2 with the lower layer coarse denier fiber web b2, wherein the temperature of the hot air oven H2 is set to 135° C. The material is then wound to form the fine denier composite non-woven fabric 2.

By adopting the above-mentioned solution, the lower layer coarse denier fiber web b2 is produced in-line and without undergoing winding, thus reducing the requirements for winding and unwinding equipment. This also reduces transportation during intermediate stages, thereby lowering production costs, and reducing transportation pollution risks. Moreover, the lower layer coarse denier fiber web b2, being composed solely of unbonded fibers, exhibits better fluffiness than non-woven fabrics produced off-line after unwinding. Therefore, the fine denier composite non-woven fabric 2 obtained by compounding the upper layer fine denier fiber web a2 with the lower layer coarse denier fiber web exhibits superior fluffiness. In addition, the lower layer coarse denier fiber web b2 produced in-line can also be a spunbonded fiber web or a melt-blown fiber web, among other options.

The above descriptions represent merely preferred embodiments of the present invention, and therefore should not be used to limit the scope of the present invention. All equivalent changes and modifications made within the scope of the present invention patent and the content of the specification are considered to fall within the coverage of the present invention.

The invention claimed is:

1. A fine denier composite non-woven fabric comprising an upper layer fine denier fiber web composed of fibers with a fiber denier less than or equal to 1.0 denier and a lower layer coarse denier fiber web composed of fibers with a fiber denier of 2.0 deniers to 12.0 deniers; the upper layer fine denier fiber web being composed of side-by-side bi-component crimped spunbond long fibers, and adjacent side-by-side bi-component crimped spunbond long fibers being bonded to each other through surface melting; the side-by-side bi-component crimped spunbond long fibers being composed of a high-melting-point resin and a low-melting-point resin with a difference in melting points of over 20° C.; the high-melting-point resin and the low-melting-point resin having different shrinkage stresses; the lower layer coarse denier fiber web having a gram weight of 5 g/m$^2$ to 10 g/m$^2$.

2. The fine denier composite non-woven fabric of claim 1, wherein the upper layer fine denier fiber web has a fiber denier of 0.6 denier to 1.0 dernier.

3. The fine denier composite non-woven fabric of claim 1, wherein the lower layer coarse denier fiber web is a fiber web with no bonding between fibers or a non-woven fabric with presence of bonding between fibers.

* * * * *